US012595062B2

(12) United States Patent
Rossini

(10) Patent No.: US 12,595,062 B2
(45) Date of Patent: Apr. 7, 2026

(54) COCKPIT TABLE SYSTEM

(71) Applicant: Inflight Innovations LLC, Eden Prairie, MN (US)

(72) Inventor: Trever Andrew Rossini, Shakopee, MN (US)

( * ) Notice: Subject to any disclaimer, the term of this patent is extended or adjusted under 35 U.S.C. 154(b) by 226 days.

(21) Appl. No.: 18/238,899

(22) Filed: Aug. 28, 2023

(65) Prior Publication Data

US 2024/0116637 A1      Apr. 11, 2024

Related U.S. Application Data

(63) Continuation-in-part of application No. 17/500,377, filed on Oct. 13, 2021, now Pat. No. 11,845,559.

(51) Int. Cl.
*B64D 11/00* (2006.01)
*B64D 11/06* (2006.01)

(52) U.S. Cl.
CPC ................................ *B64D 11/0638* (2014.12)

(58) Field of Classification Search
CPC ............ B64D 11/0638; B64D 11/0689; B64D 11/0015; B64D 11/00152; B64D 11/0624; B64D 11/0605; B64D 11/0646; B60N 3/001; B60N 3/002; B60N 3/004; B60N 3/00; A47C 7/70; A47B 81/002; A47B 2003/145; A47B 23/004; A47B 3/002; A47B 3/082; A47B 3/0818; A47B 83/02; B60R 7/04
USPC ......... 108/40, 42, 44, 25, 137, 143, 93, 102, 108/103; 297/188.21, 157.1, 158.2, 297/158.4, 162, 163, 173, 188.2, 164, 17, 297/4 R, 411.32, 411.21, 411.3; 296/24.34, 1.09, 37.8
See application file for complete search history.

(56) References Cited

U.S. PATENT DOCUMENTS

| | | | | |
|---|---|---|---|---|
| 510,282 | A | * | 12/1893 | Moody |
| D153,348 | S | * | 4/1949 | Gainsboro ................... D12/423 |
| 2,469,657 | A | * | 5/1949 | Linda ..................... B60N 3/004 |
| | | | | 108/147.11 |
| 2,846,287 | A | * | 8/1958 | Gardner .................. E06B 3/385 |
| | | | | 312/285 |
| 3,311,276 | A | * | 3/1967 | Fromm ..................... B60R 7/04 |
| | | | | 224/277 |

(Continued)

FOREIGN PATENT DOCUMENTS

| | | | | |
|---|---|---|---|---|
| CN | 102975616 | A * | 3/2013 | ............... B60R 7/04 |
| DE | 10026561 | A1 * | 12/2001 | ......... B64D 11/0638 |

(Continued)

*Primary Examiner* — Janet M Wilkens

(57) ABSTRACT

A cockpit table system includes an airplane cockpit having a pair of front seats. A console is positioned in front of the seats and includes a central section that extends between the seats. The central section has a first lateral wall positioned adjacent to a first one of the seats and a second lateral wall positioned adjacent to a second one of the seats. A top wall extends between the first and second lateral walls. A frame is mounted to the console and is positioned adjacent to and outside of each of the first and second lateral walls. A first tray is mounted on the frame adjacent to the first lateral wall and a second tray is mounted on the frame adjacent to the second lateral wall. The first and second trays laterally extend away from each other and over their respectively adjacent seats.

19 Claims, 14 Drawing Sheets

(56) References Cited

U.S. PATENT DOCUMENTS

| | | | | |
|---|---|---|---|---|
| 3,589,577 A * | 6/1971 | Basinger | B60R 11/00 | 224/540 |
| 5,282,556 A * | 2/1994 | Bossert | B60R 7/04 | 224/571 |
| 5,823,599 A * | 10/1998 | Gray | B60R 21/216 | 224/929 |
| 5,951,128 A * | 9/1999 | Aidone | B60R 7/043 | 312/235.8 |
| 6,032,840 A * | 3/2000 | Gregory | B60R 7/005 | 224/277 |
| 6,793,281 B2 * | 9/2004 | Duerr | B60N 2/753 | 297/173 |
| 11,845,559 B2 * | 12/2023 | Rossini | B64D 11/0638 | |
| 2005/0035618 A1 * | 2/2005 | Toth | B60N 2/793 | 296/24.34 |
| 2011/0127380 A1 * | 6/2011 | Orgerie | B64D 13/00 | 244/118.5 |
| 2013/0057010 A1 * | 3/2013 | Vasko | B60R 7/04 | 296/24.34 |
| 2014/0252811 A1 * | 9/2014 | Whalen | B60N 3/002 | 297/173 |
| 2015/0251606 A1 * | 9/2015 | Murray | B60R 11/00 | 296/37.1 |
| 2017/0369173 A1 * | 12/2017 | Lee | B60N 2/79 | |
| 2022/0379790 A1 * | 12/2022 | Line | B60N 3/002 | |
| 2023/0116152 A1 * | 4/2023 | Rossini | B64D 11/0638 | 244/118.6 |

FOREIGN PATENT DOCUMENTS

| | | | | |
|---|---|---|---|---|
| DE | 202004003844 U1 * | 7/2005 | B60R 7/04 |
| DE | 102004011979 A1 * | 10/2005 | B60R 7/04 |
| DE | 102023004404 A1 * | 5/2024 | B60R 7/04 |
| FR | 3007341 A1 * | 12/2014 | B60N 3/002 |
| GB | 2511207 A * | 8/2014 | B60N 3/004 |
| KR | 200146220 Y1 * | 6/1999 | B60N 3/002 |
| KR | 20000072086 A * | 12/2000 | B60N 3/10 |

* cited by examiner

COCKPIT TABLE SYSTEM

CROSS-REFERENCE TO RELATED APPLICATIONS

This is a continuation in part application and I hereby claim the benefit under 35 U.S.C., Section 120 of U.S. application Ser. No. 17/500,377 filed Oct. 13, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tray table device and more particularly pertains to a new tray table device for providing a surface that can be used for holding articles such as small electronics, to serve as a writing space, and to support food items in a location that is convenient within an aircraft cockpit and particularly those cockpits that include an extended center console positioned between pilot and co-pilot seats. These types of cockpits are well known for being very tight fitting and therefore do not provide room for typical table assemblies. As such, a pilot, in particular, is often left with little choice but to physically hold onto items such as notebooks, maps, computer tablets, coffee cups and the like or inconveniently set these articles on their lap.

(2) Description of Related Art Including Information Disclosed Under 37 CFR 1.97 and 1.98

The prior art relates to tray table devices that are useful when the can either be folded out of a chair armrest or extended rearwardly from a forwardly positioned seat. However, these types of devices cannot be readily modified to fit within a cockpit having a center console which includes aircraft avionic equipment.

BRIEF SUMMARY OF THE INVENTION

An embodiment of the disclosure meets the needs presented above by generally comprising an airplane cockpit having a pair of front seats. A console is positioned in front of the seats and includes a central section that extends between the seats. The central section has a first lateral wall positioned adjacent to a first one of the seats and a second lateral wall positioned adjacent to a second one of the seats. A top wall extends between the first and second lateral walls. A frame is mounted to the console and is positioned adjacent to and outside of each of the first and second lateral walls. A first tray is mounted on the frame adjacent to the first lateral wall and a second tray is mounted on the frame adjacent to the second lateral wall. The first and second trays laterally extend away from each other and over their respectively adjacent seats.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
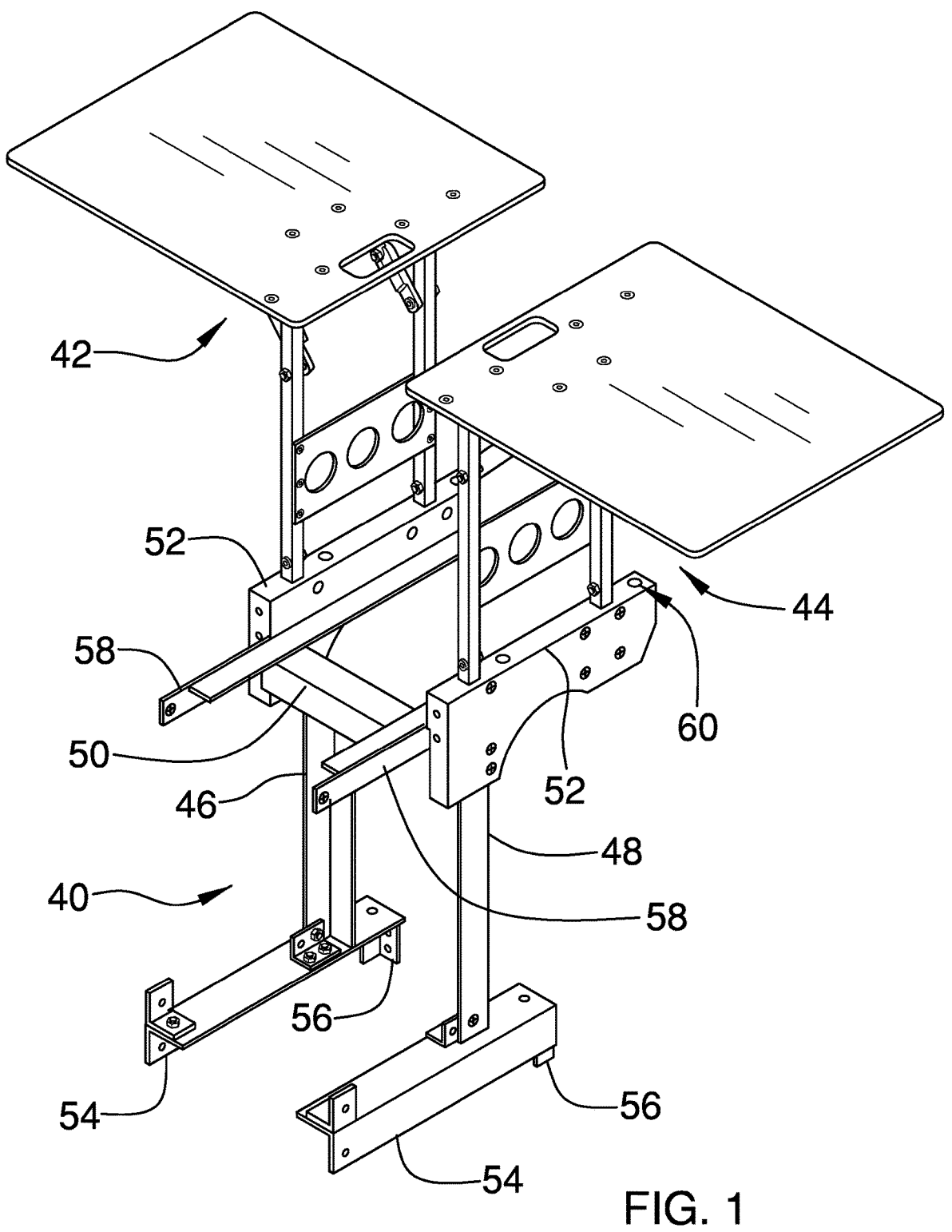
FIG. 1 is a front isometric view of a cockpit table system according to an embodiment of the disclosure.
Figure 2:
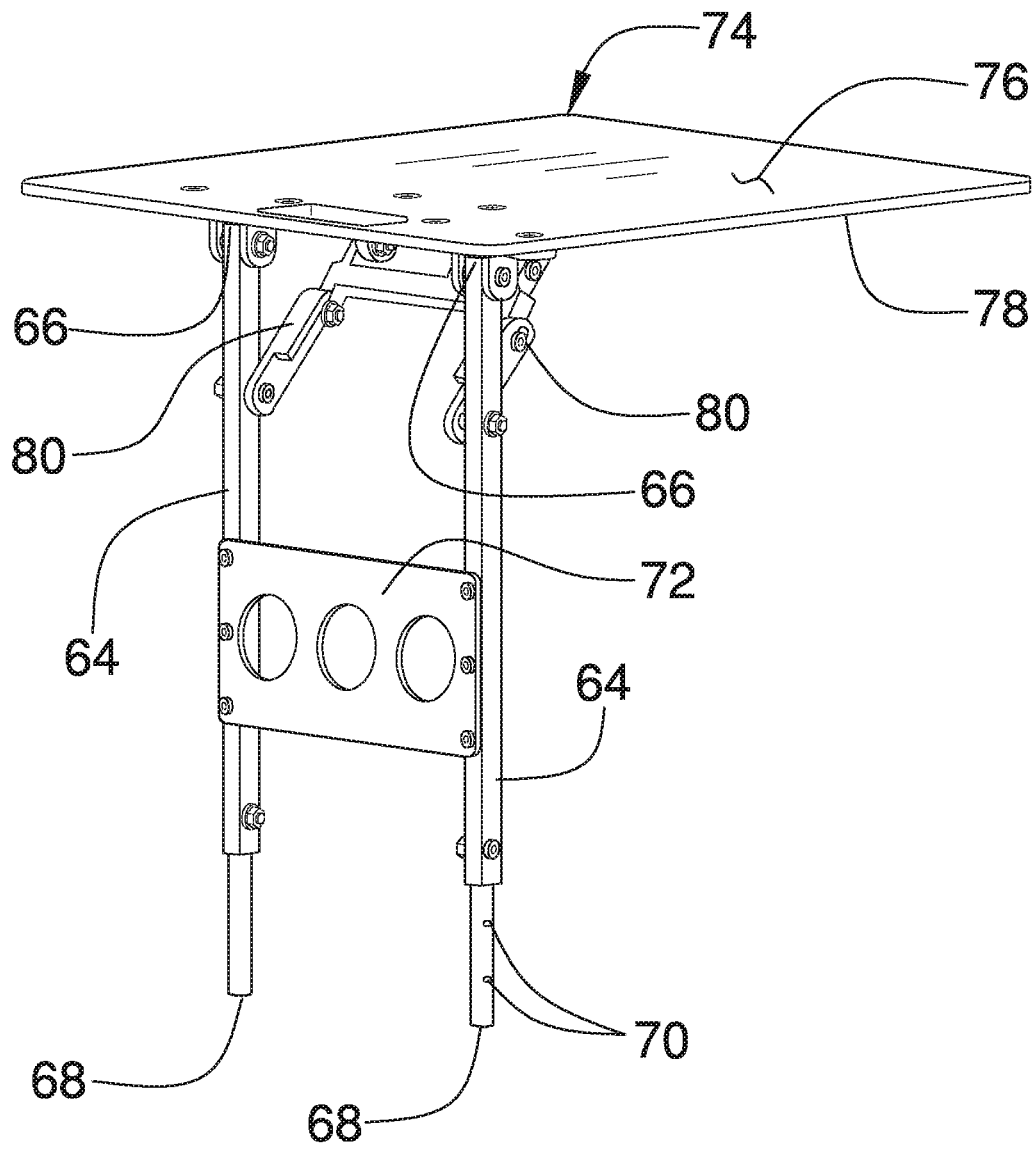
FIG. 2 is a side isometric view of a tray table of an embodiment of the disclosure.

With reference now to the drawings, and in particular to FIGS. 1 through 14 thereof, a new tray table device embodying the principles and concepts of an embodiment of the disclosure and generally designated by the reference numeral 10 will be described.

Figure 7:
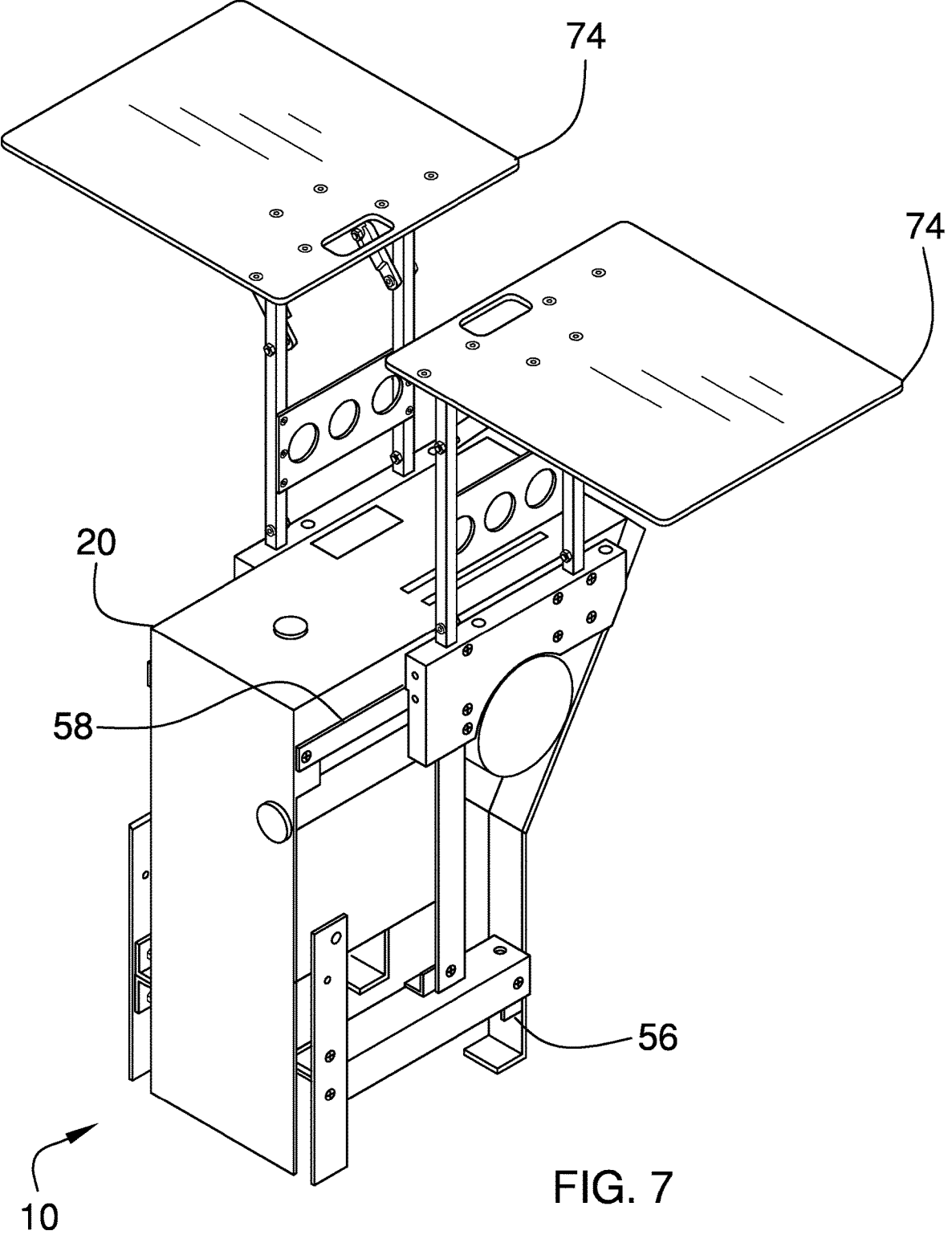
FIG. 7 is a top isometric view of an embodiment of the disclosure.
Figure 8:
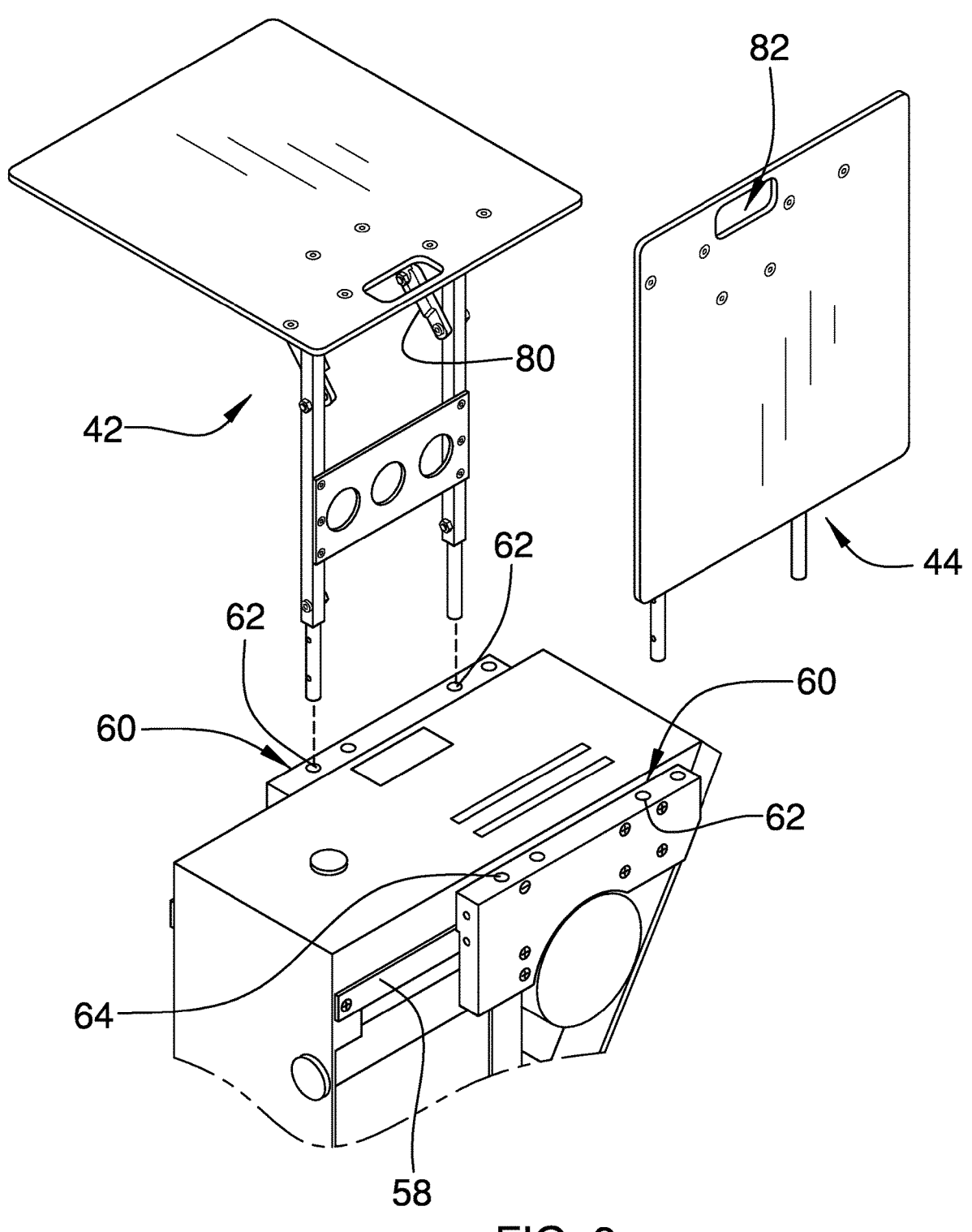
FIG. 8 is a top isometric view of an embodiment of the disclosure.
Figure 9:
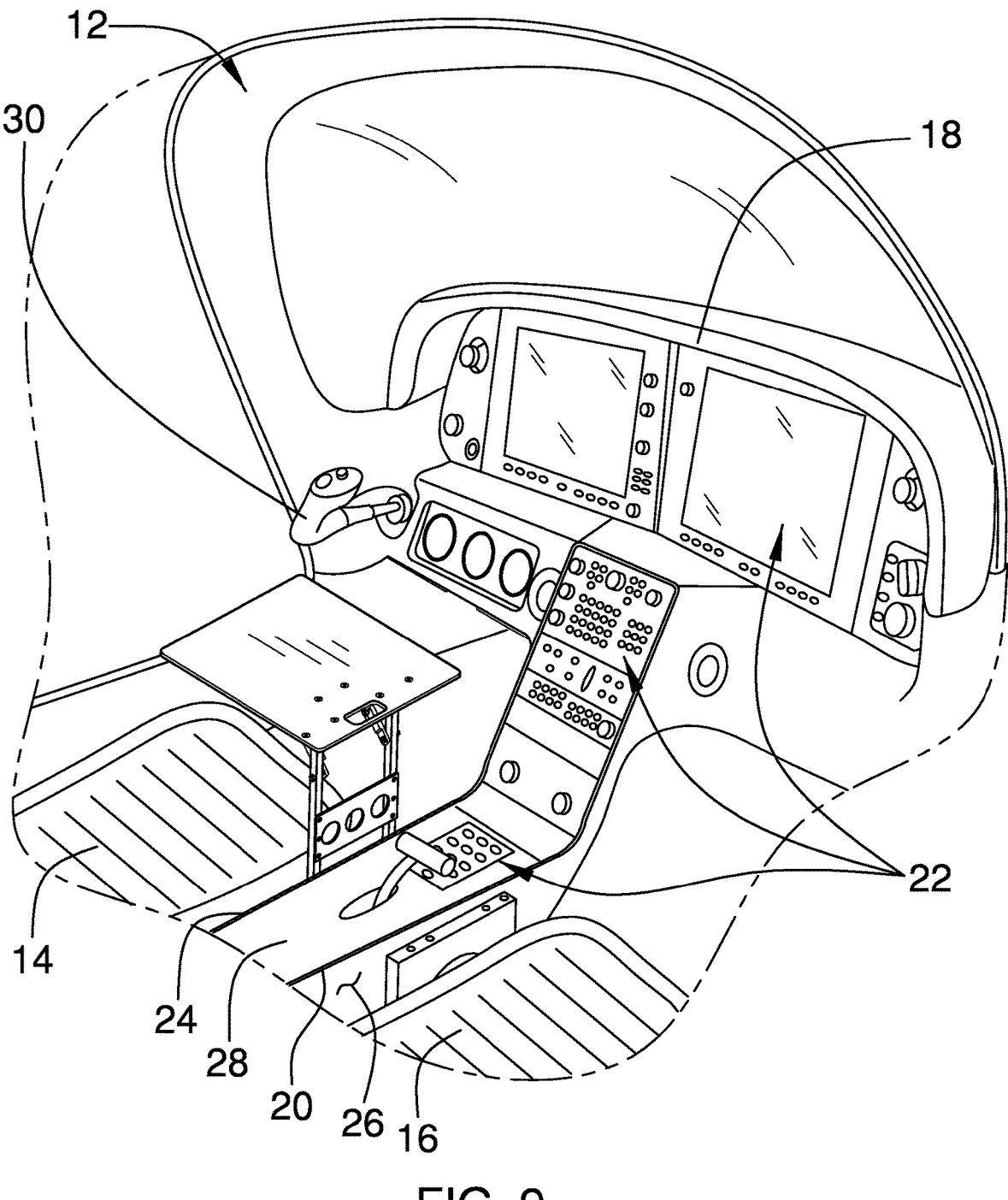
FIG. 9 is a top isometric view of an embodiment of the disclosure.
Figure 10:
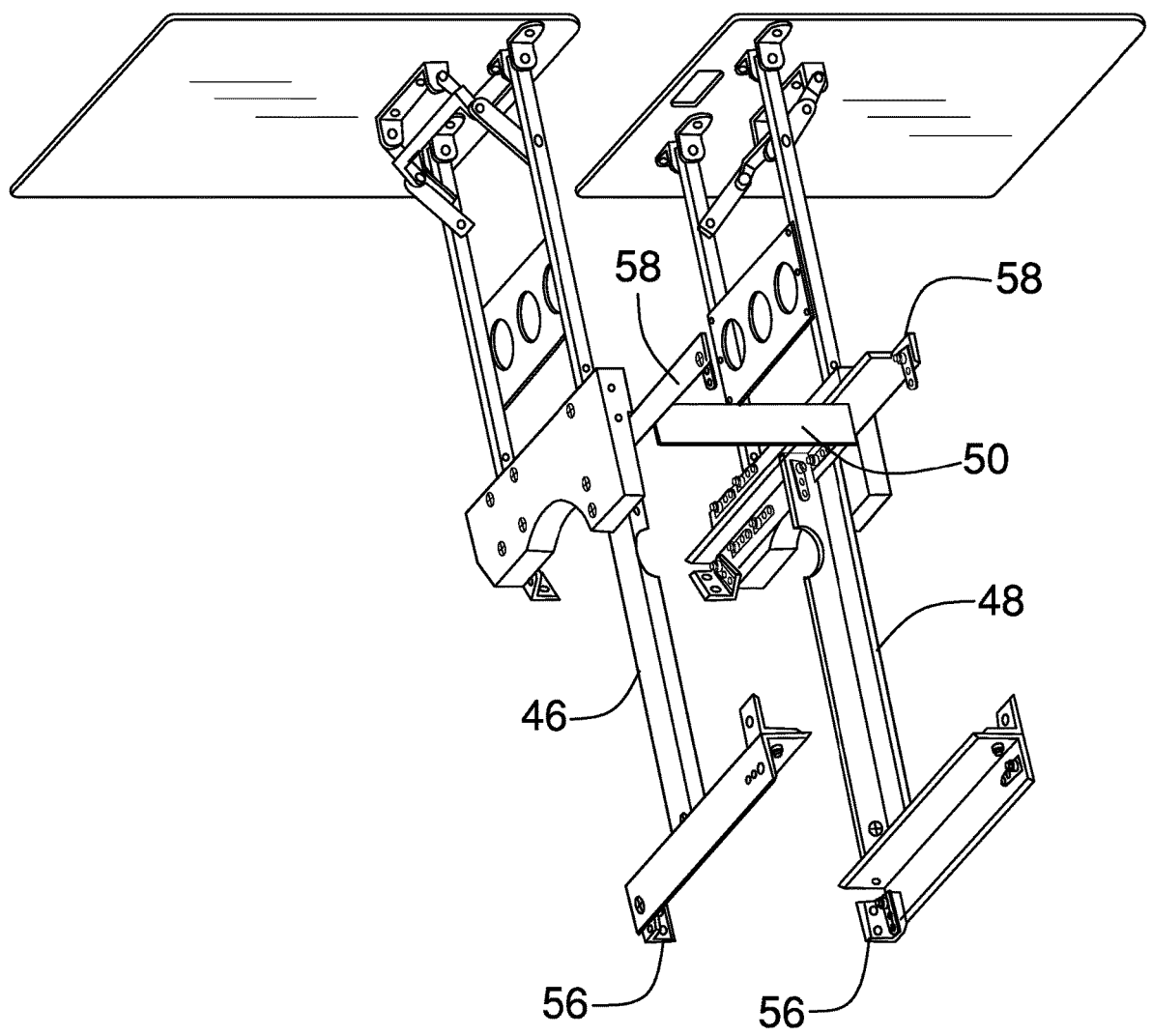
FIG. 10 is a bottom and rear isometric view of an embodiment of the disclosure.
Figure 11:
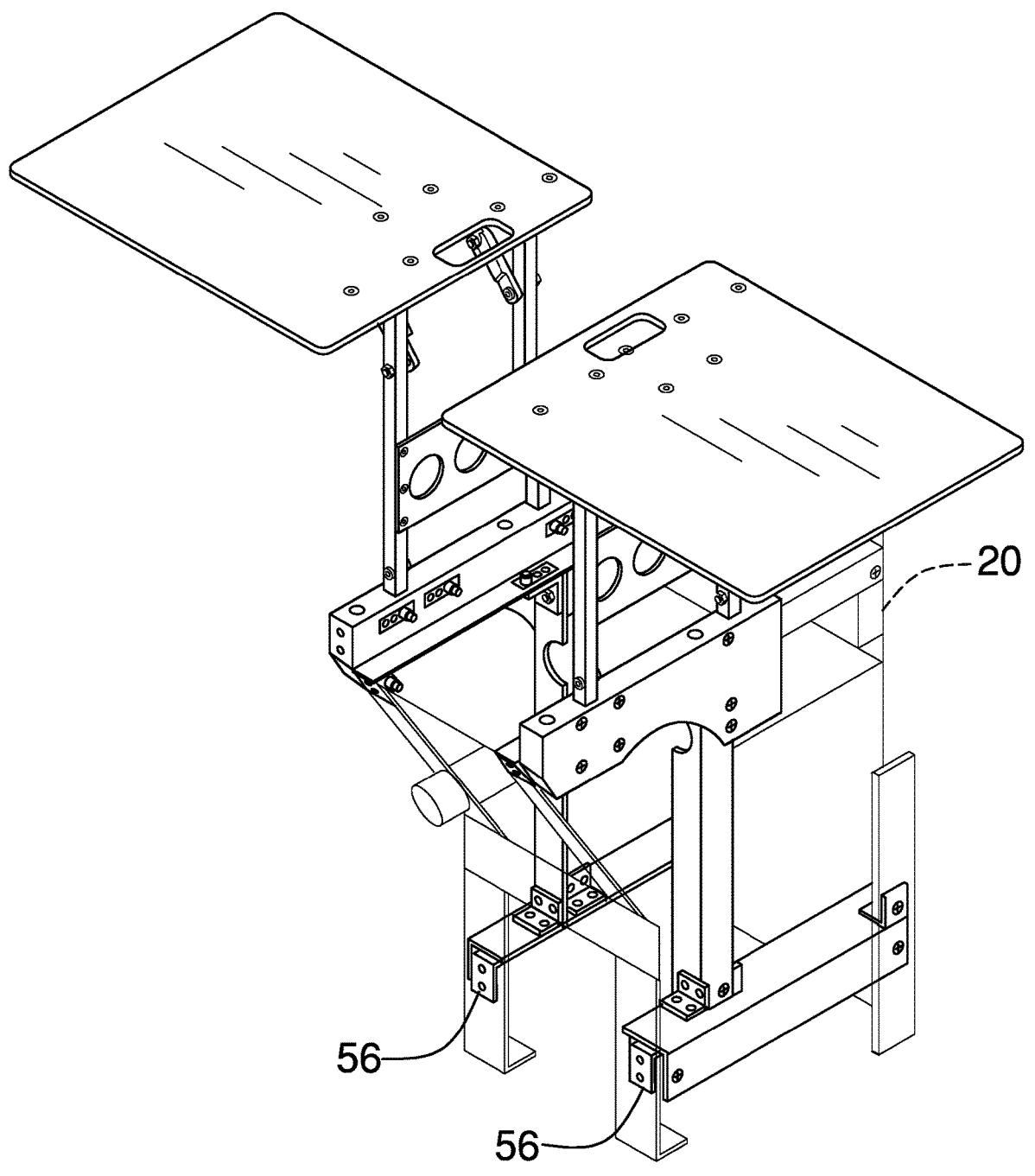
FIG. 11 is a front isometric view of an embodiment of the disclosure.

As best illustrated in FIGS. 1 through 14, the cockpit table system 10 generally comprises a conventional airplane cockpit 12 having a pair of front seats 14, 16 and a console 18 that is positioned in front of the seats. The console 18 includes a central section 20 extending between the seats 14, 16. The console 18 provides the location for the avionics 22 including displays, radios, and flight controls within the cockpit of an airplane. The central section 20 provides additional space for controls, sensor displays and the like. The internal frame of the central section 20 is depicted in FIG. 7 and does not include overlay which is shown in FIG. 9. The airplane cockpit 12 of the current system 10 is one which may be found, for example, in Cirrus models SR20, SR22, and Vision Jet aircraft. These aircraft further include joystick controls 30 extending from the console 18. The central section 20 has a first lateral wall 24 positioned adjacent to a first one of the seats 14 and a second lateral wall 26 positioned adjacent to a second one of the seats 16. A top wall 28 extends between the first 24 and second 26 lateral walls.

A frame 40 is mounted to the console 18 and is positioned adjacent to and outside of each of the first 24 and second 26 lateral walls. A first tray 42 is mounted on the frame 40 adjacent to the first lateral wall 24 and a second tray 44 is mounted on the frame 40 adjacent to the second lateral wall 26. The first 42 and second 44 trays laterally extend away from each other. That is, the first 42 and second 44 trays extend toward adjacent ones of the seats 14, 16 as opposed to extending over the top wall 28 of the central section 20. The first 42 and second 44 trays may be removably mounted to the frame 40.

More particularly, the frame 40 includes a first side support 46 positioned adjacent to the first lateral wall 24 and a second side support 48 positioned adjacent to the second lateral wall 26. A brace 50 may be attached to the first 46 and second 48 side supports and extend through the central section 20 to provide rigidity between the central section 20 and the frame 40 and between the first 46 and second 48 side supports. Since the first 46 and second 48 supports are located between the seats 14, 16 and the central section 20 and the brace 50 extends through the central section 20, any lateral movement of the frame 40 is greatly impeded.

Each of the first 46 and second 48 side supports has an upper end 52 and a lower end 54. In some embodiments, each of the first 46 and second 48 side supports includes a lower bracket 56 that is removably attached to the central section 20 with conventional fasteners and positioned adjacent to the lower end 54, as well as an upper bracket 58 that is removably attached to the central section 20 with conventional fasteners and positioned adjacent to the upper end 52. It should be readily apparent that the frame 40 may include additional or different bracketing and fasteners for attaching the frame 40 to the central section 20, to the seats 14, 16, or to a floor of an airplane cockpit 12.

For reasons that will be clear below, each of the upper ends 52 may comprise a receiver 60 having a pair of wells 62 vertically extending downwardly therein. The wells 62 are spaced from each other wherein one of the wells 62 is positioned rearwardly with respect to another one of the wells 62. The wells 62 may have therein detents 63 or other frictional engaging members. The detents 63 depicted in the Figures include ball bearings biased into the wells, perpendicular to vertical axis of the wells 62, by springs. The receiver 60 may include a plurality of wells 62 to allow different spacing as needed.

Each of the first 42 and second 44 trays includes a pair of legs 64 each having a top end 66 and a bottom end 68. The bottom ends 68 are each removably extendable into a respective one of the wells 62. The legs 64 may include indents 70 for receiving the detents 63 and each of the legs 64 may be telescopic and have an adjustable height. A strut 72 extends between and is attached to the legs 64 to add rigidity to the legs 72 and to the first 42 and second 44 trays they are respectively attached to.

Figure 3:
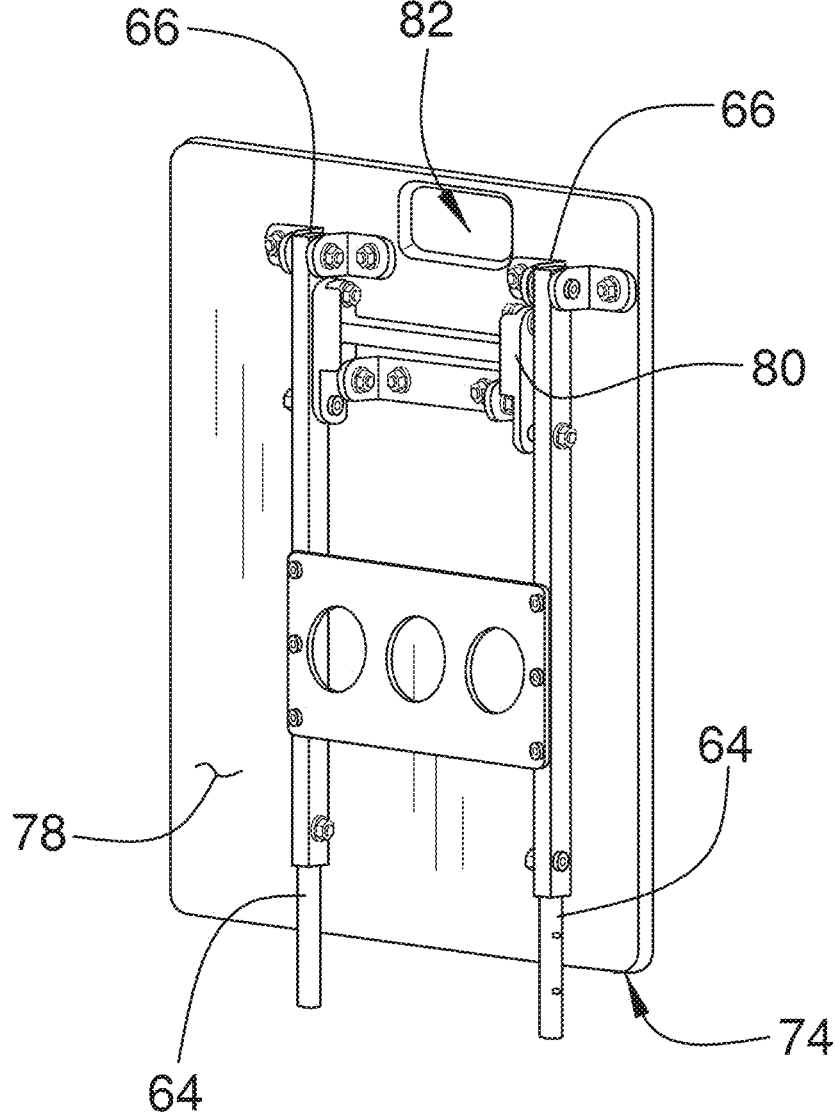
FIG. 3 is a bottom view of a tray of an embodiment of the disclosure in a stowable condition.
Figure 4:
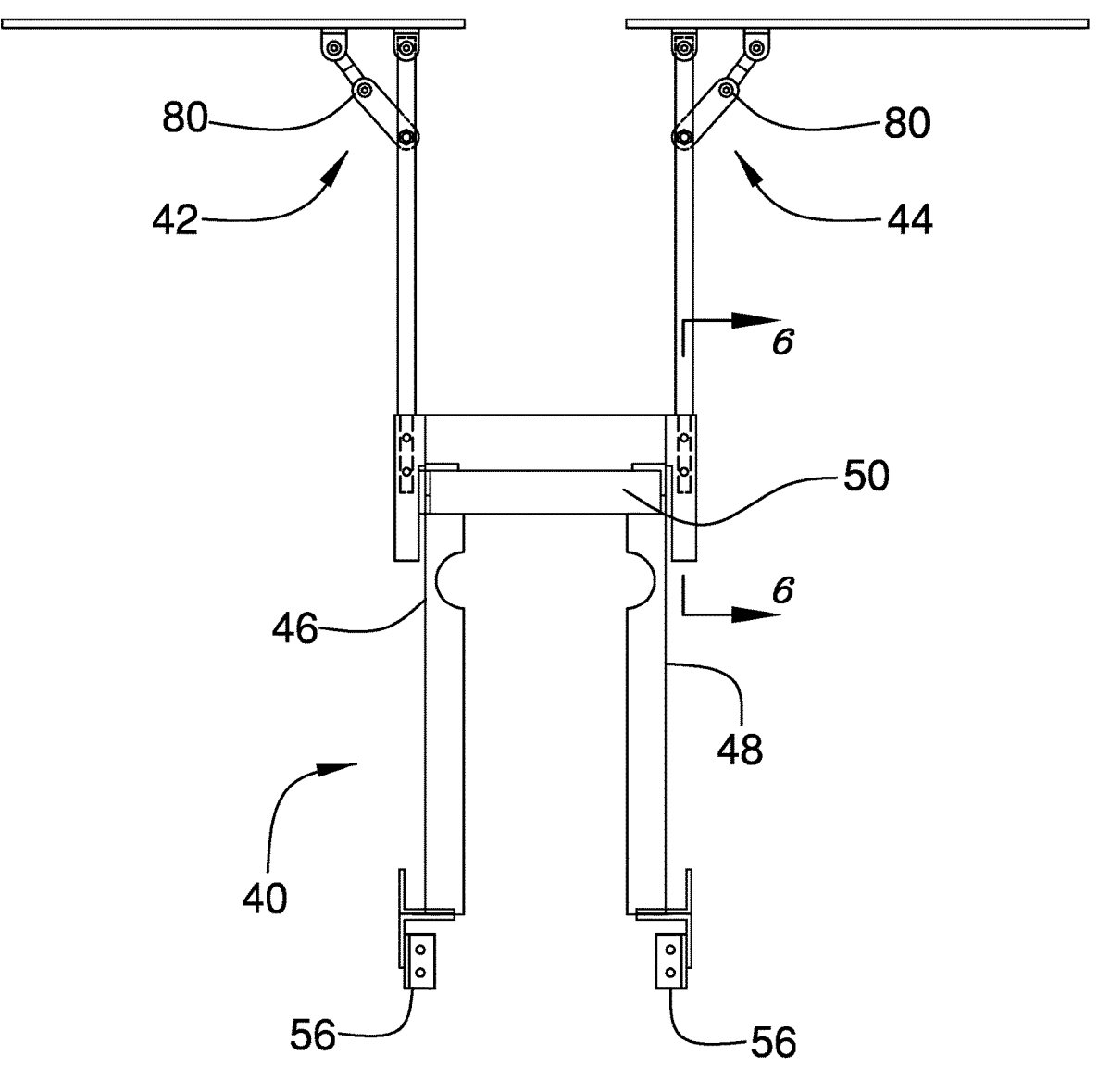
FIG. 4 is a rear view of an embodiment of the disclosure.
Figure 5:
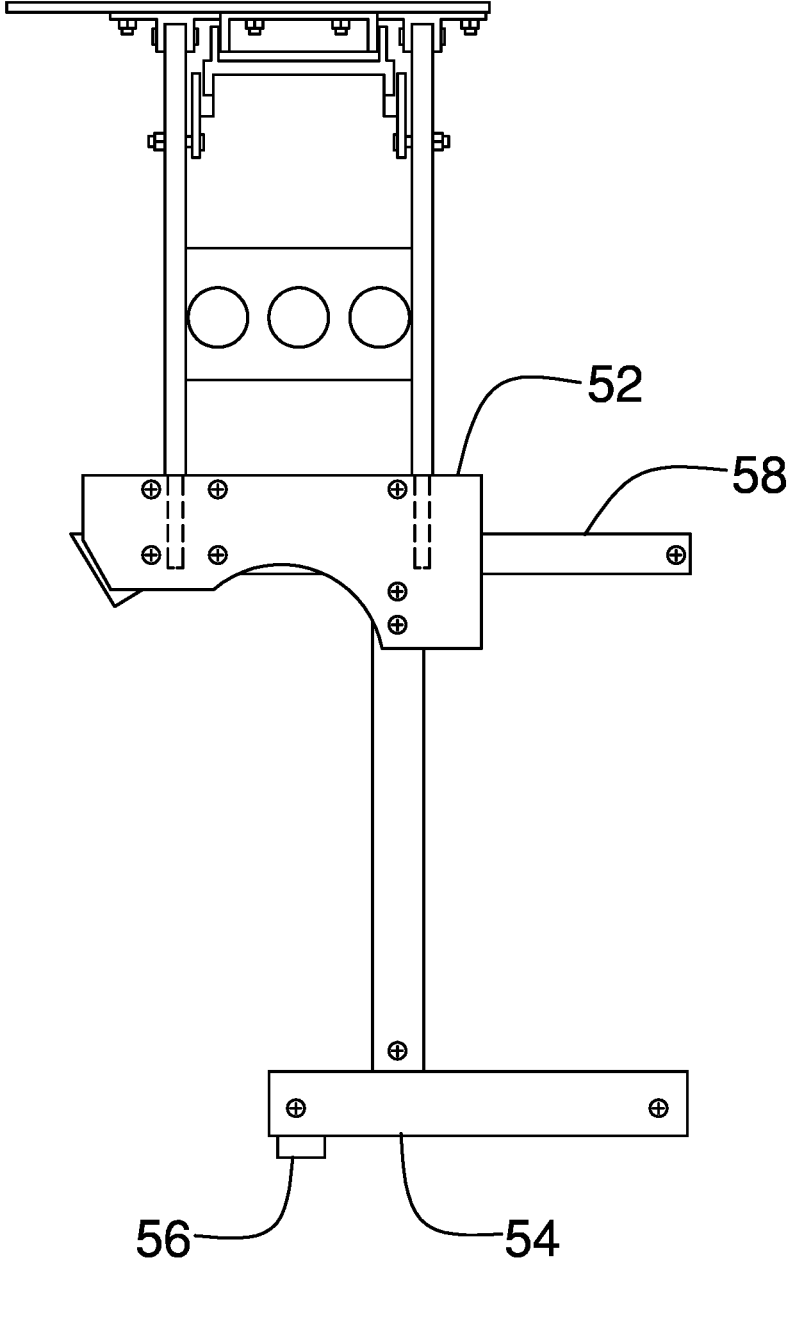
FIG. 5 is a side view of an embodiment of the disclosure.
Figure 6:
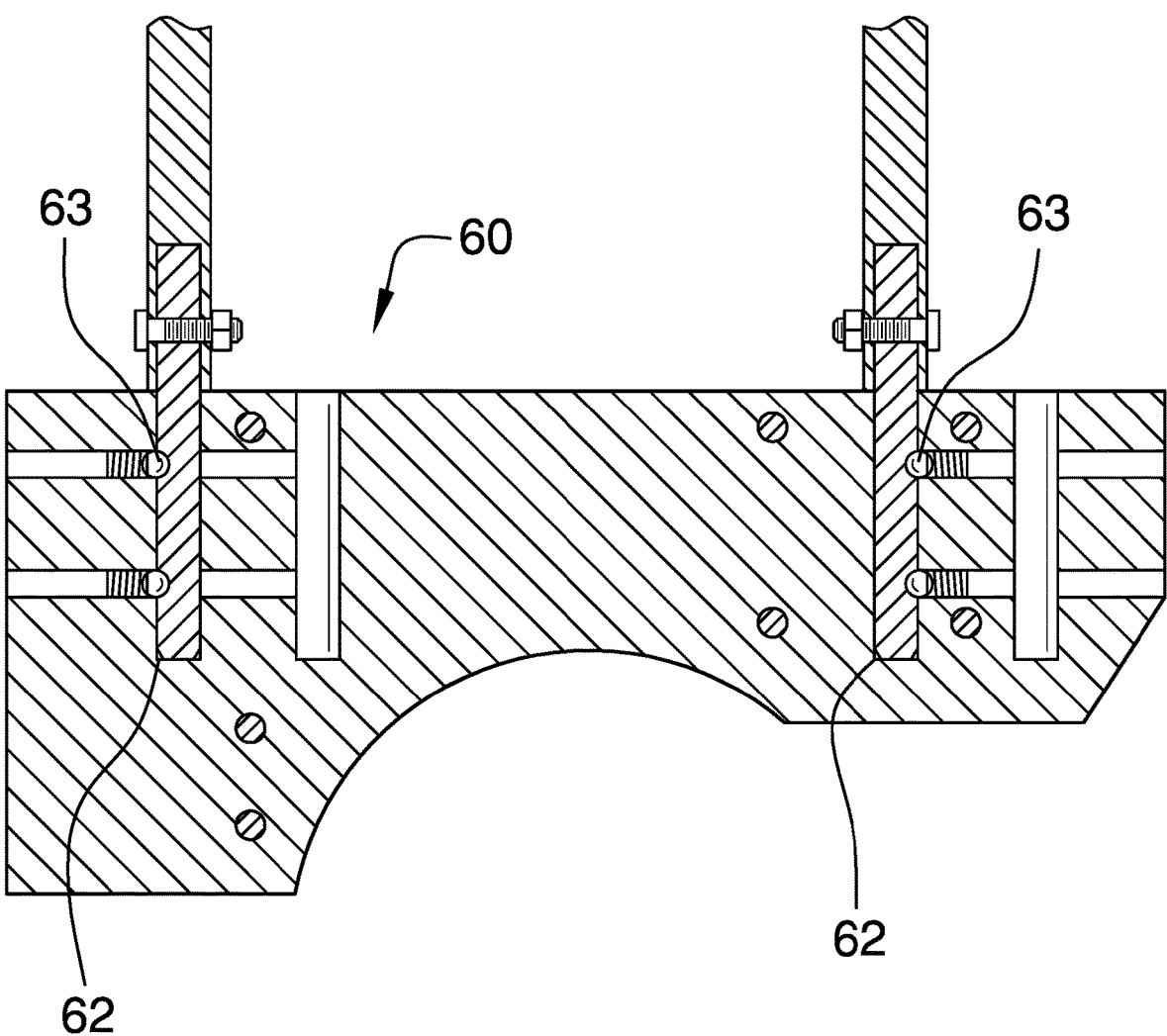
FIG. 6 is a cross-sectional view of an embodiment of the disclosure taken along line 6-6 of FIG. 4.

The first 42 second 44 trays further each include a panel 74 having a top side 76 and a bottom side 78. The panel 74, comprising a rigid material such as plastics wood, or metals, is coupled to the legs 64 adjacent to the top ends 66 of the legs 64 and serves as the table, or tray, of the system 10. In some embodiments, the panel 74 may be attached to the legs 64 pivotally to allow the panel 74 to fold down, as shown in FIG. 3, for storage purposes. In one embodiment, a pair of supports 80 is provided and each of the legs 64 has one of the supports 80 attached thereto. Each of the supports 80 is further attached to the panel 74. The supports 80 retain the panel 74 in a horizontal orientation when the legs are vertically orientated. The supports 80 are collapsible to allow the panel 74 to be folded downwardly against the legs 64. Alternate types of supports are well known in the art of folding tables and may be used in place of the supports 80 shown in the Figures. The panels 74 may include an opening 82 to assist in gripping the panels 74 when attaching them to the receivers 60. Though not shown, the panels 74 may include depressions or wells to serve as drink container holding areas. In other embodiments the legs 64 may be provided with a single post or other similar connector that is releasably engageable with the receiver 60.

Figure 12:
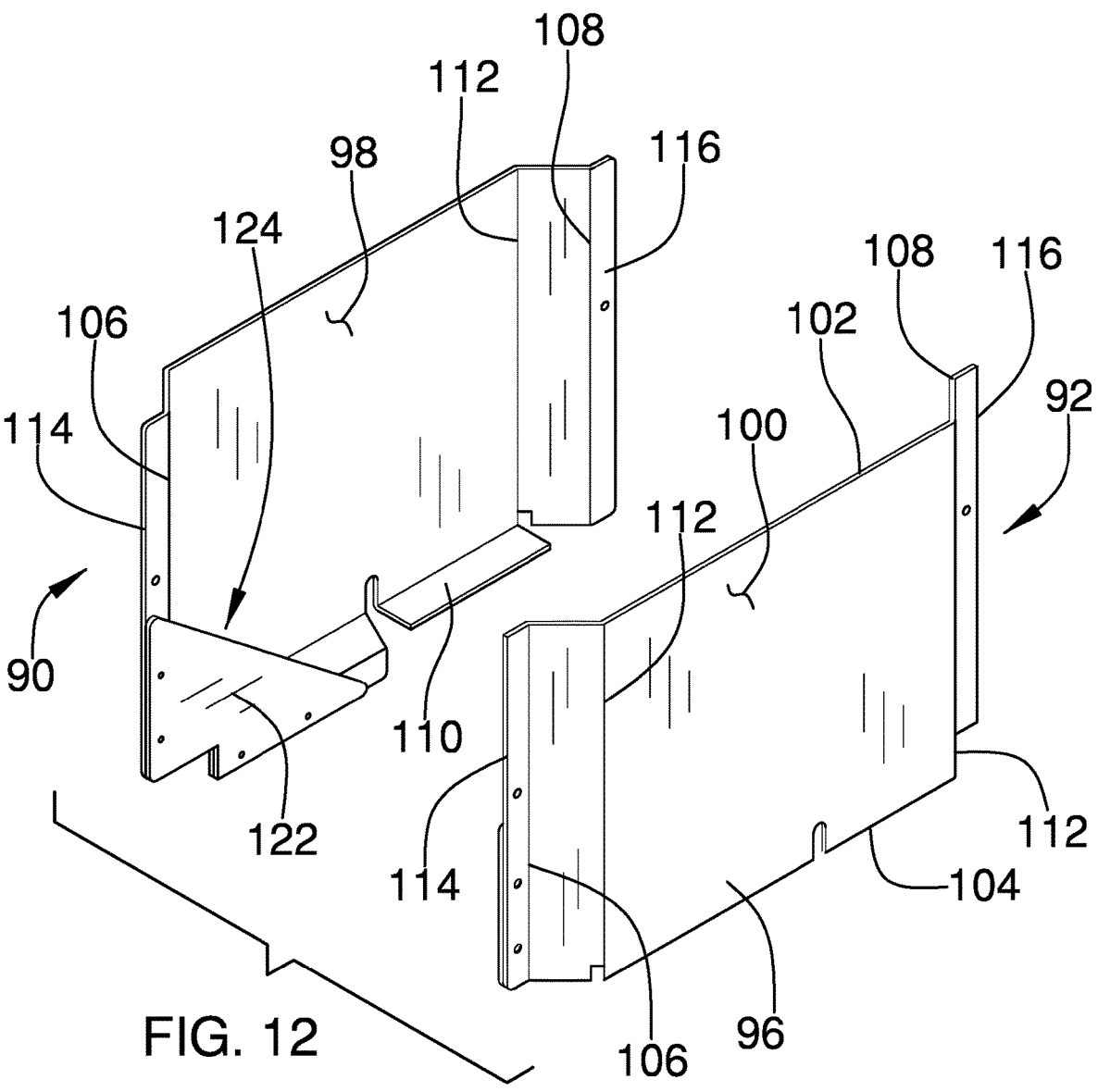
FIG. 12 is a front, top isometric view of a pocket attachment of an embodiment of the disclosure.
Figure 13:
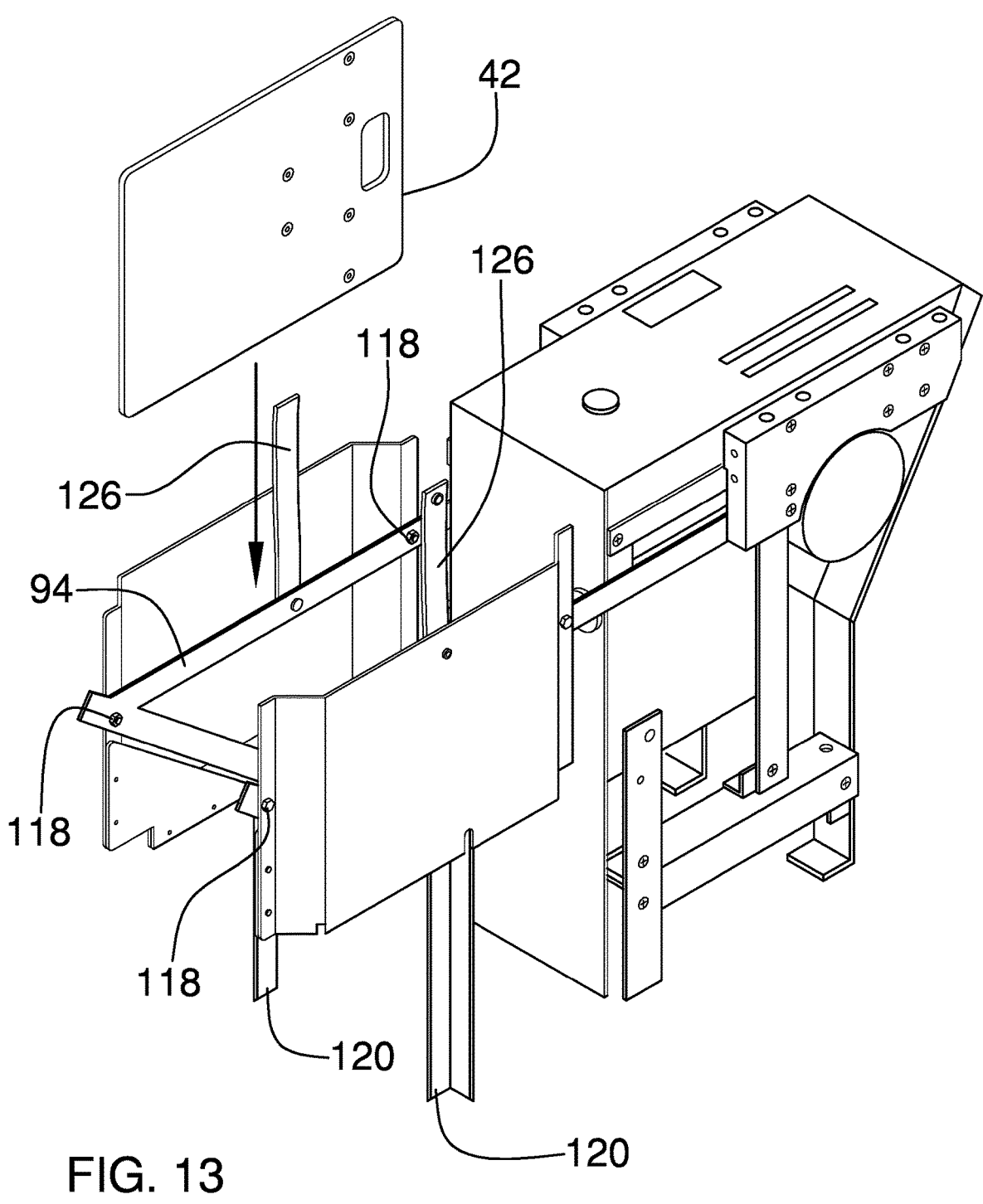
FIG. 13 is a bottom and rear isometric view of an embodiment of the disclosure.
Figure 14:
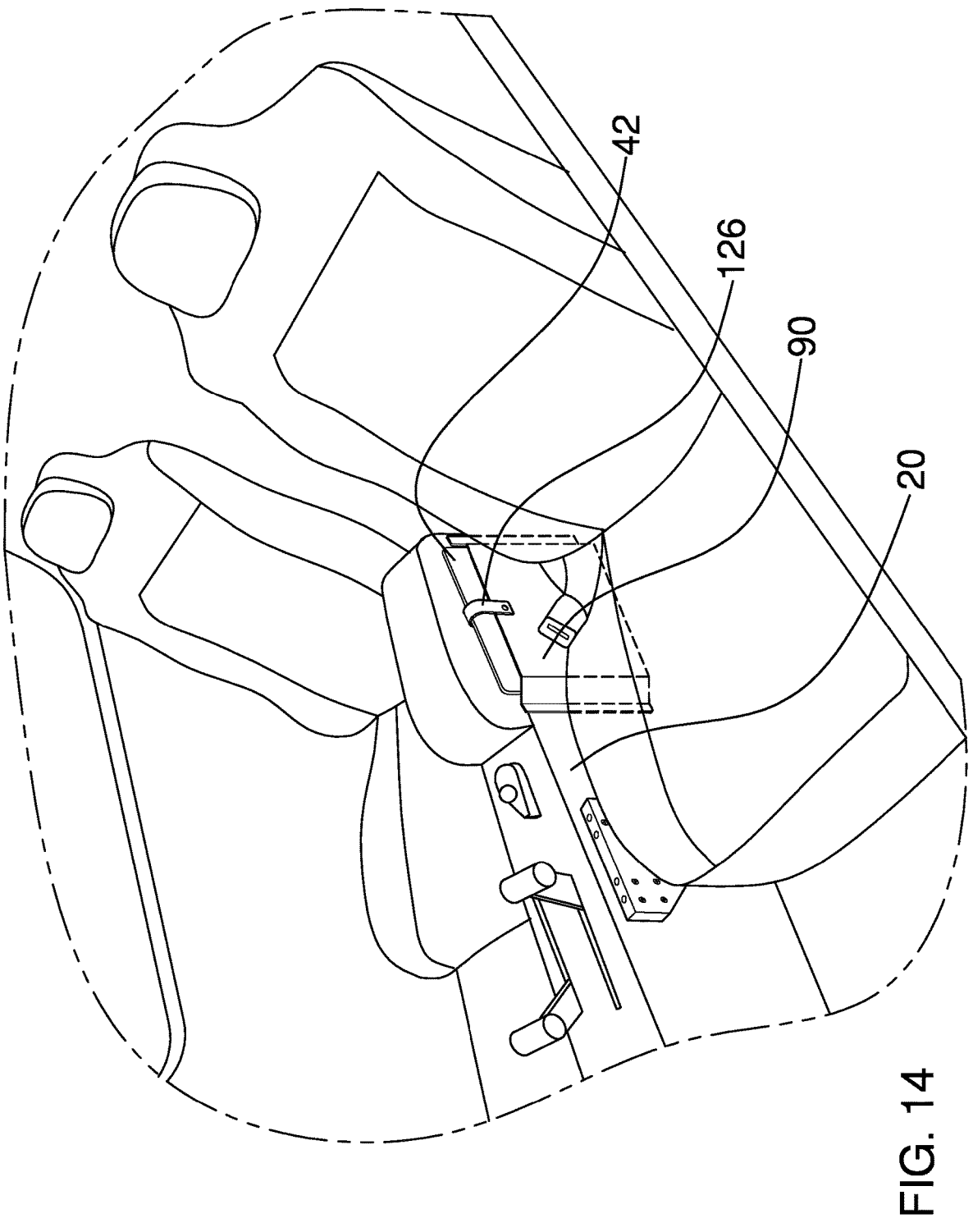
FIG. 14 is a front isometric view of an embodiment of the disclosure.

In an embodiment found in FIGS. 12-14, a first pocket 90 and a second pocket 92 are provided. The first pocket 90 and the second pocket 92 are each attached to the frame 40 and is sized to receive one of the first 42 and second 44 trays. A stored position is defined when the first 90 or second 92 pockets contains an associated one of the first 42 or second 44 trays. The first pocket 90 is positioned adjacent to the first lateral wall 24 and the second pocket 92 is positioned adjacent to the second lateral wall 26. In one embodiment, the first pocket 90 is attached to the upper bracket 58 of the first side support 46, and the second pocket 92 is attached to the upper bracket 58 of the second side support 48, though other connections are contemplated. The first 90 and second 92 pockets are each positioned rearward of the wells 62. That is, relative to the front seats 14, 16, the first 90 and second 92 pockets are rearward of the upper bracket receivers 60 and are attached to the upper brackets 58 by a linkage 94.

The first 90 and second 92 pockets may be formed by multiple configurations. In one preferred embodiment, each of the first 90 and second 92 pockets includes a plate 96 comprised of a rigid material, such as a metal or plastic, and has an interior side 98 and an exterior side 100. The interior side 98 faces the central section 20 of the console 18. The plate 96 has an upper edge 102, a lower edge 104, a first lateral edge 106, and a second lateral edge 108. A lip 110 is attached to the lower edge 104. The lip 110 forms an angle with the interior side 98 that will typically approximate a perpendicular angle though it may have a measurement between 80° and 110°. The associated one of the first 42 and second 44 trays is supported by the lip 110 when in the stored position as shown in FIG. 14.

The plate 96, of each of the first 90 and second 92 pockets, has a pair of bends 112 therein each extending from the upper edge 102 to the lower edge 104. Each of the bends 112 forms an obtuse angle in the interior side 98 to offset a central area of the plate 96 from the central section 20 of the console 18. A first flange 114 is attached to the first lateral edge 106 and a second flange 116 is attached to the second lateral edge 108. The first 114 and second 116 flanges each lie in a plane spaced from and orientated parallel to a plane of the plate 96 between the bends 112 in the plate 96. Fasteners 118 are extendable through the first 114 and second 116 flanges and into the frame 40, or linkage 94 as is shown in FIG. 13. A vertical member 120 may be attached to and extending downwardly from the plate 96 to provide support for the weight of the plate 96 and a tray 42, 44 it may be supporting. The vertical member 120 may be attached to the central section 20. A retention wall 122 may be attached to the lip 110 and to one or both of the first 114 or second flanges 116. The retention wall 122 is spaced from the plate 96 to define a receiving space 124 for the associated one of the first 42 and second 44 trays.

As is understood from the above and the Figures, the first 90 and second 96 pockets will have an upper end opening formed between the central section 20 and the plate 96. This allows the user to slide the associated first 42 and second 44 tray into its first 90 or second 92 pocket when not in use. A securing device 126 comprising a retaining strap 126, clasp, or other conventional securing device may be utilized with the first 90 and second 92 pockets and which may extend over or through the associated one of the first 42 and second 44 trays. This will prevent the trays 42, 44 from lifting upwardly from their pockets 90, 92 during turbulent flying conditions.

In use, typically the frame 40 will be attached to the central section 20 as described above and generally shown in the Figures. This will place a pair of receivers 60 on opposite sides of the central section 20 to accommodate the first 42 and second 44 trays. The first 42 and second 44 trays can be removed from storage and engaged with the receivers 60 and the panels 74 extended with the supports 80 to place the panels 74 in a generally horizontal orientation extending over adjacent ones of the seats 14, 16. In this position, the panels 74 serve as a table for placement of tablets, items to be written on, food items and the like. When the user does not require the panel 74, they are removed and stowed. The panels 74 are positioned such that they do not interfere with the central section 20 controls or with the joystick 30 and therefore do not impede operation of the aircraft.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A center console tray system comprising:
an airplane cockpit having a pair of front seats, a console being positioned in front of the seats, the console including a central section extending between the seats, the central section having a first lateral wall positioned adjacent to a first one of the seats and a second lateral wall positioned adjacent to a second one of the seats, a top wall extends between the first and second lateral walls;
a frame being mounted to the console and being positioned adjacent to and outside of each of the first and second lateral walls;
a first tray being mounted on the frame adjacent to the first lateral wall and a second tray being mounted on the frame adjacent to the second lateral wall, the first and second trays laterally extending away from each other, the first and second trays are removably mounted to the frame;
a first pocket and a second pocket each being attached to the frame, each of the first and second pockets being sized to receive one of the first and second trays, wherein a stored position is defined when the first or second pockets contains an associated one of the first or second trays; and
wherein the frame includes
a first side support positioned adjacent to the first lateral wall,
a second side support positioned adjacent to the second lateral wall, and
a brace being attached to the first and second side supports and extending through the central section.

2. The center console tray system according to claim 1, wherein the frame includes:
each of the first and second side supports having an upper end and a lower end;
each of the first and second side supports including:
a lower bracket being removably attached to the central section and positioned adjacent to the lower end; and
an upper bracket being removably attached to the central section and positioned adjacent to the upper end.

3. The center console tray system according to claim 2, wherein:
each of the upper ends including a receiver comprising a pair of wells, the wells being spaced from each other wherein one of the wells is positioned rearwardly with respect to another one of the wells;
each of the first and second trays including:
a pair of legs each having a top end and a bottom end, each of the bottom ends being removably extendable into a respective one of the wells; and
a panel having a top side and a bottom side, the panel being coupled to the legs adjacent to the top ends of the legs.

4. The center console tray system according to claim 3, wherein the first pocket is positioned adjacent to the first lateral wall and the second pocket is positioned adjacent to the second lateral wall, the first pocket being attached to the upper bracket of the first side support, the second pocket being attached to the upper bracket of the second side support, the first and second pockets each being positioned rearward of the wells.

5. The center console tray system according to claim 4, wherein each of the first and second pockets further includes:
a plate comprised of a rigid material and having an interior side and an exterior side, the interior side facing the central section of the console, the plate having an upper edge, a lower edge, a first lateral edge, and a second lateral edge; and a lip being attached to the lower edge, the lip forming an angle with the interior side having a measurement between 80° and 110°, the associated one of the first and second trays being supported by the lip when in the stored position.

6. The center console tray system according to claim 5, wherein each the first and second pockets further includes:

the plate having a pair of bends therein each extending from the upper edge to the lower edge, each of the bends forming an obtuse angle in the interior side;

a first flange being attached to the first lateral edge, a second flange being attached to the second lateral edge, the first and second flanges lying in a plane orientated parallel to a plane of the plate between the bends in the plate, wherein fasteners are extendable through the first and second flanges and into the frame.

7. The center console tray system according to claim 6, wherein the first and second pockets further includes a vertical member being attached to and extending downwardly from the plate.

8. The center console tray system according to claim 6, wherein the first and second pockets further include a retention wall being attached to the first flange and the lip, the retention wall being spaced from the plate to define a receiving space for the associated one of the first and second trays.

9. The center console tray system according to claim 1, wherein:

the frame includes:

each of the first and second side supports having an upper end, each of the upper ends including a receiver, the receiving comprising a well;

each of the first and second trays including:

a leg releasably engageable with the receiver; and a panel having a top side and a bottom side, the panel being coupled to the legs adjacent to top ends of the leg, the panel being pivotally coupled to the leg; and a support attached to the leg, the leg having the support attached thereto, the support being attached to the panel, the support retaining the panel in a horizontal orientation when the leg is vertically orientated, the support being collapsible to allow the panel to be folded downwardly against the leg.

10. The center console tray system according to claim 1, wherein the first pocket is positioned adjacent to the first lateral wall and the second pocket is positioned adjacent to the second lateral wall.

11. The center console tray system according to claim 10, wherein each of the first and second pockets further includes:

a plate comprised of a rigid material and having an interior side and an exterior side, the interior side facing the central section of the console, the plate having an upper edge, a lower edge, a first lateral edge, and a second lateral edge; and a lip being attached to the lower edge, the lip forming an angle with the interior side having a measurement between 80° and 110°, the associated one of the first and second trays being supported by the lip when in the stored position.

12. The center console tray system according to claim 11, wherein each the first and second pockets further includes:

the plate having a pair of bends therein each extending from the upper edge to the lower edge, each of the bends forming an obtuse angle in the interior side;

a first flange being attached to the first lateral edge, a second flange being attached to the second lateral edge, the first and second flanges lying in a plane orientated parallel to a plane of the plate between the bends in the plate, wherein fasteners are extendable through the first and second flanges and into the frame.

13. The center console tray system according to claim 12, wherein the first and second pockets further include a retention wall being attached to the first flange and the lip, the retention wall being spaced from the plate to define a receiving space for the associated one of the first and second trays.

14. A center console tray system comprising:

an airplane cockpit having a pair of front seats, a console being positioned in front of the seats, the console including a central section extending between the seats, the central section having a first lateral wall positioned adjacent to a first one of the seats and a second lateral wall positioned adjacent to a second one of the seats, a top wall extends between the first and second lateral walls;

a frame being mounted to the console and being positioned adjacent to and outside of each of the first and second lateral walls;

a first tray being mounted on the frame adjacent to the first lateral wall and a second tray being mounted on the frame adjacent to the second lateral wall, the first and second trays laterally extending away from each other, the first and second trays are removably mounted to the frame;

a first pocket and a second pocket each being attached to the frame, each of the first and second pockets being sized to receive one of the first and second trays, wherein a stored position is defined when the first or second pockets contains an associated one of the first or second trays;

wherein the first pocket is positioned adjacent to the first lateral wall and the second pocket is positioned adjacent to the second lateral wall;

wherein each of the first and second pockets further includes:

a plate comprised of a rigid material and having an interior side and an exterior side, the interior side facing the central section of the console, the plate having an upper edge, a lower edge, a first lateral edge, and a second lateral edge, and a lip being attached to the lower edge, the lip forming an angle with the interior side having a measurement between 80° and 110°, the associated one of the first and second trays being supported by the lip when in the stored position;

wherein each the first and second pockets further includes:

the plate having a pair of bends therein each extending from the upper edge to the lower edge, each of the bends forming an obtuse angle in the interior side, and a first flange being attached to the first lateral edge, a second flange being attached to the second lateral edge, the first and second flanges lying in a plane orientated parallel to a plane of the plate between the bends in the plate, wherein fasteners are extendable through the first and second flanges and into the frame; and wherein the first and second pockets further includes a vertical member being attached to and extending downwardly from the plate.

15. A center console tray system comprising:

an airplane cockpit having a pair of front seats, a console being positioned in front of the seats, the console including a central section extending between the seats, the central section having a first lateral wall positioned adjacent to a first one of the seats and a second lateral wall positioned adjacent to a second one of the seats, a top wall extends between the first and second lateral walls;

a frame being mounted to the console and being positioned adjacent to and outside of each of the first and second lateral walls;

a first tray being mounted on the frame adjacent to the first lateral wall and a second tray being mounted on the frame adjacent to the second lateral wall, the first and second trays laterally extending away from each other, the first and second trays are removably mounted to the frame;

a first pocket and a second pocket each being attached to the frame, each of the first and second pockets being sized to receive one of the first and second trays, wherein a stored position is defined when the first or second pockets contains an associated one of the first or second trays;

wherein the frame includes a first side support positioned adjacent to the first lateral wall, a second side support positioned adjacent to the second lateral wall, and each of the first and second side supports having an upper end, each of the upper ends including a receiver, the receiving comprising a well;

wherein each of the first and second trays including:

a leg releasably engageable with the receiver, a panel having a top side and a bottom side, the panel being coupled to the legs adjacent to top ends of the leg, the panel being pivotally coupled to the leg, and a support attached to the leg, the leg having the support attached thereto, the support being attached to the panel, the support retaining the panel in a horizontal orientation when the leg is vertically orientated, the support being collapsible to allow the panel to be folded downwardly against the leg; and wherein the first pocket is positioned adjacent to the first lateral wall and the second pocket is positioned adjacent to the second lateral wall.

16. The center console tray system according to claim 15, wherein each of the first and second pockets further includes:

a plate comprised of a rigid material and having an interior side and an exterior side, the interior side facing the central section of the console, the plate having an upper edge, a lower edge, a first lateral edge, and a second lateral edge; and a lip being attached to the lower edge, the lip forming an angle with the interior side having a measurement between 80° and 110°, the associated one of the first and second trays being supported by the lip when in the stored position.

17. The center console tray system according to claim 16, wherein each the first and second pockets further includes:

the plate having a pair of bends therein each extending from the upper edge to the lower edge, each of the bends forming an obtuse angle in the interior side;

a first flange being attached to the first lateral edge, a second flange being attached to the second lateral edge, the first and second flanges lying in a plane orientated parallel to a plane of the plate between the bends in the plate, wherein fasteners are extendable through the first and second flanges and into the frame.

18. The center console tray system according to claim 17, wherein the first and second pockets further includes a vertical member being attached to and extending downwardly from the plate.

19. The center console tray system according to claim 17, wherein the first and second pockets further include a retention wall being attached to the first flange and the lip, the retention wall being spaced from the plate to define a receiving space for the associated one of the first and second trays.

* * * * *